Feb. 4, 1969     D. E. MOEHLENKAMP     3,425,445

CONTROL SYSTEMS

Filed Oct. 10, 1966

United States Patent Office 3,425,445
Patented Feb. 4, 1969

3,425,445
CONTROL SYSTEMS
Donald E. Moehlenkamp, Florissant, Mo., assignor to Conductron Corporation, Charles, Mo., a corporation of Delaware
Filed Oct. 10, 1966, Ser. No. 585,519
U.S. Cl. 137—565
Int. Cl. G05d 16/20, 7/06
9 Claims

ABSTRACT OF THE DISCLOSURE

Masses of air are moved toward an inlet port of a device and those masses of air are kept under a predetermined pressure by using an air-moving pump to force those masses of air through a pressure regulator; and further masses of air are moved away from an outlet port of that device and those further masses of air are kept under a lesser predetermined pressure by using a further pressure regulator.

---

Figure 1:
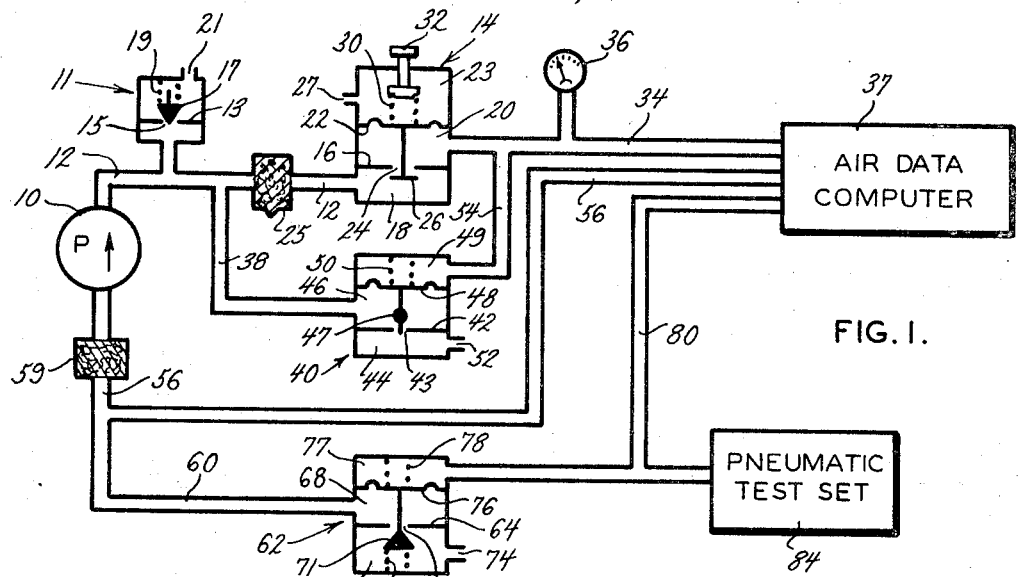

This invention relates to improvements in control systems. More particularly, this invention relates to improvements in control systems for masses of air that are in motion and that are under pressure.

It is, therefore an object of the present invention to provide an improved control system for masses of air that are in motion and that are under pressure.

It is frequently desirable to move masses of air while keeping those masses of air under predetermined pressures. For example, in testing the static pressure compensator in the air data computer of an aircraft, it is desirable to move masses of air to the inlet port of that air data computer while keeping those masses of air under a predetermined pressure, and it also is desirable to move masses of air away from the outlet port of that air data computer while keeping those masses of air under a lesser predetermined pressure. The control system provided by the present invention makes it possible to move masses of air to the inlet port of an air data computer, while keeping those masses of air under a predetermined pressure, by using an air-moving pump to force those masses of air through a pressure regulator before they reach that inlet port; and it makes it possible to move masses of air away from the outlet port of that air data computer, while keeping those masses of air under a lesser pressure, by using a further pressure regulator to maintain that lesser pressure at the inlet port of that air-moving pump. It is, therefore, an object of the present invention to provide a control system which uses an air-moving pump to force masses of air through a pressure regulator before those masses of air are applied to the inlet port of an air data computer, and to use a further pressure regulator to maintain a lesser pressure on masses of air moving away from the outlet port of that air data computer and toward the inlet port of that air-moving pump.

The control system provided by the present invention supplies a reference pressure to the further pressure regulator; and that reference pressure can be varied to vary the pressure maintainted on the masses of air moving away from the outlet port of the air data computer and toward the inlet port of the air-moving pump. By varying that reference pressure, it is possible to vary the pressure on the air moving away from the outlet port of the air data computer, and thereby test the operation of the static pressure compensator in that air data computer at pressures corresponding to different altitudes. It is, therefore, an object of the present invention to provide a control system which supplies a reference pressure to a pressure regulator, to maintain a predetermined pressure on masses of air moving away from the outlet port of an air data computer and toward the inlet port of an air-moving pump, and which can vary that reference pressure to vary that predetermined pressure and thereby test the operation of the static pressure compensator in that air data computer at pressures corresponding to different altitudes.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

Figure 2:
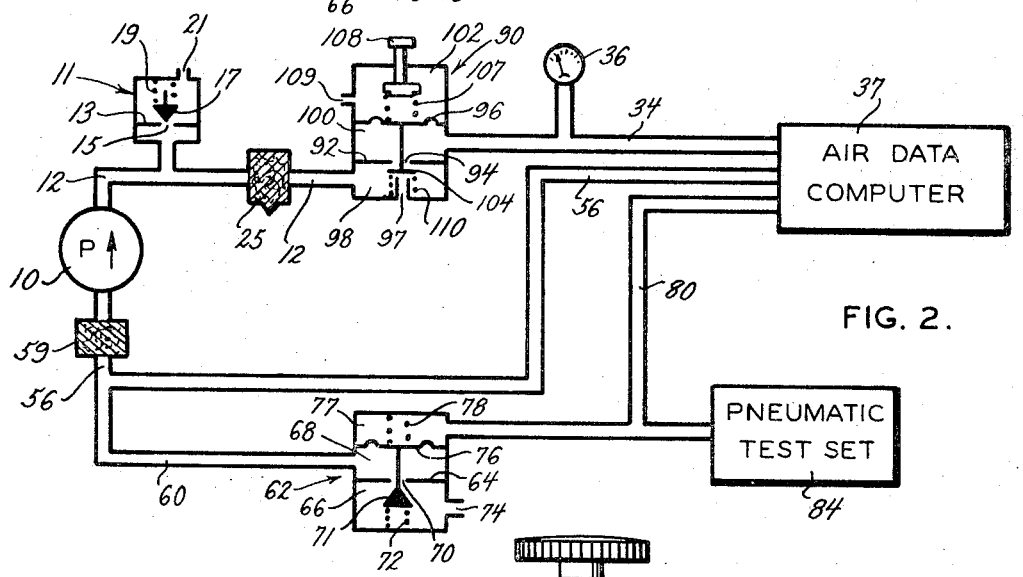
Figure 3:
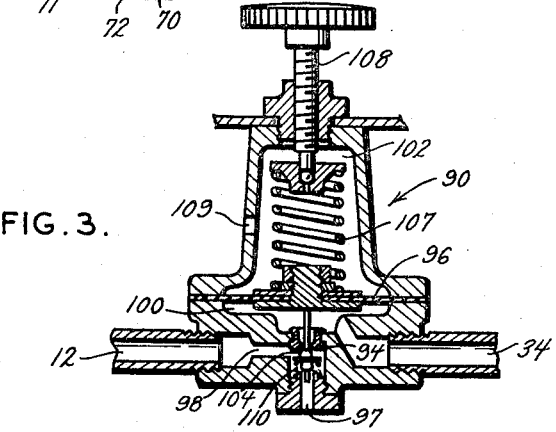

In the drawing, FIG. 1 is a diagrammatic showing of one preferred embodiment of control system that is made in accordance with the principles and teachings of the present invention, FIG. 2 is a diagrammatic showing of a second preferred embodiment of control system that is made in accordance with the principles and teachings of the present invention, and FIG. 3 is a sectional view, on a larger scale, through one of the pressure-regulating valves shown by FIG. 2.

Referring to the drawing in detail, the numeral 10 generally denotes an air-moving pump of standard and usual form that is driven by a motor, not shown. The outlet port of the air-moving pump 10 is connected to the inlet port of a pressure-regulating valve 14 by a conduit 12 and a combination air filter and water separator 25. That combination air filter and water separator can be of standard and usual form.

A pressure-relieving valve 11 is connected to the conduit 12 intermediate the outlet port of the air-moving pump 10 and the inlet of the combination air filter and water separator 25. That pressure-relieving valve has a partition 13 with a passage-forming seat 15 therein; and a movable element 17 is urged toward that seat by a helical compression spring 19. That pressure-relieving valve also has a vent 21 which opens to the atmosphere surrounding that pressure-relieving valve. If the pressure on the air that issues from the outlet port of the air-moving pump 10 ever becomes great enough to move the movable element 17 away from the seat 15; the spring 19 will yield to permit that movable element to move and to pass air to the vent 21.

The pressure-regulating valve 14 has a partition 16 and a flexible diaphragm 22 which sub-divide the housing of that valve into three compartments 18, 20 and 23. The inlet port of the pressure-regulating valve 14 communicates directly with the compartment 18, the outlet port of that valve communicates directly with the compartment 20, and a vent 27 places the compartment 23 in direct communication with the atmosphere surrounding that valve. The partition 16 has a passage-forming seat 24 therein; and a movable element 26, which is carried by the flexible diaphragm 22, is movable toward and away from that seat. An adjusting screw 32 is rotatably supported by the housing for the pressure-regulating valve 14. A helical compression spring 30 bears against the lower surface of the adjusting screw 32 and also bears against the upper surface of the flexible diaphragm 22; and the adjusting screw 32 can be rotated relative to the housing of the pressure-regulating valve 14 to adjust the pressure on the spring 30. The force which the spring 30 exerts upon the flexible diaphragm 22 will tend to move the movable element 26 away from the seat 24, whereas the pressure on the air within the chamber 20 will act against the under surface of that flexible diaphragm and will tend to move that movable element toward that seat. Appropriate adjustment of the position of the adjusting screw 32 will enable the spring 30 to apply a force to the flexible diaphragm which will enable the pressure-regulating valve 14 to establish and maintain a predetermined pressure at the outlet port thereof.

A conduit 34 extends from the outlet port of the pressure-regulating valve 14 to the inlet of an air data computer 37 which can be part of an aircraft. A Bourdon pressure gauge 36 is connected to the conduit 34, intermediate the outlet port of the pressure-regulating valve 14 and the inlet of the air data computer 37; and that gauge will indicate the pressure on the air within the conduit 34.

A differential pressure control valve 40 has the inlet port thereof connected to the conduit 12 by a conduit 38; and it has the outlet port thereof connected to the conduit 34 by a conduit 54. A partition 42 and a flexible diaphragm 48 sub-divide the housing of the differential pressure control valve 40 into three compartments 44, 46 and 49. The conduit 38 communicates directly with the compartment 46, the compartment 44 communicates directly with the ambient atmosphere by means of a vent 52, and the compartment 49 communicates directly with the conduit 54. The partition 42 has a passage-forming seat 43; and a movable element 47 is movable toward and away from that seat by the flexible diaphragm 48. A helical compression spring 50 and the pressure on the air in the compartment 49 urge the flexible diaphragm 48 downwardly; and the pressure on the air in the compartment 46 will urge that flexible diaphragm upwardly. The force applied to the flexible diaphragm 48 by the spring 50 will be great enough to cause the differential pressure control valve 40 to keep the pressure in the conduit 38 substantially three pounds per square inch above the level of the pressure in the conduit 54. If the pressure in the conduit 38 tends to increase further, relative to the pressure in the conduit 54, the flexible diaphragm 48 will flex upwardly and move the movable element 47 further away from the seat 43—thereby venting more air through compartment 44 and vent 52 to hold the pressure in the conduit 38 at the desired differential over the pressure in the conduit 54. If, on the other hand, the pressure in the conduit 38 tends to decrease, relative to the pressure in the conduit 54, the flexible diaphragm 48 will flex downwardly and move the movable element 47 further toward the seat 43—thereby venting less air through the compartment 44 and vent 52 to hold the pressure in the conduit 38 at the desired differential over the pressure in the conduit 54.

A filter 59 connects one end of a conduit 56 to the inlet port of the air-moving pump 10; and the other end of that conduit extends to the outlet of the air data computer 37. A conduit 60 connects the outlet port of a pressure-regulating valve 62 to the conduit 56, and thus to the inlet port of the air-moving pump 10. A partition 64 and a flexible diaphragm 76 subdivide the housing of the pressure-regulating valve 62 into three compartments 66, 68 and 77. The compartment 66 is directly connected to the ambient atmosphere by a port 74, the compartment 68 is directly connected to the conduit 60, and the compartment 77 is directly connected to the air data computer 37 and to the outlet port of a pneumatic test set 84 by a conduit 80. That pneumatic test set will develop a reference pressure; and it will supply that reference pressure to the air data computer 37 and to the compartment 77 in the pressure-regulating valve 62.

The partition 64 in the pressure-regulating valve 62 has a passage-forming seat 70 therein; and a movable element 71 is movable toward and away from that seat. A helical compression spring 78 and the reference pressure in the compartment 77 will tend to shift the flexible diaphragm 76 downwardly; and a helical compression spring 72 and the pressure in the compartment 68 will tend to shift that flexible diaphragm upwardly. The spring 78 and the spring 72 will be dimensioned so the pressure in the compartment 68 will exceed the reference pressure in the compartment 77 by a predetermined amount. If the pressure in the compartment 68 tends to exceed the reference pressure in the compartment 77 by a greater amount, the flexible diaphragm 76 will flex upwardly and will move the movable element 71 closer to the seat 70—thereby limiting the ingress of air into the compartment 66 through the port 74 and thus permitting the air-moving pump 10 to reduce the pressure in the compartment 68. If, on the other hand, the pressure in the compartment 68 fails to exceed the reference pressure in the compartment 77 by the desired predetermined amount, the flexible diaphragm 76 will flex downwardly and will move the movable element 71 farther away from the seat 70—thereby increasing the ingress of air into the compartment 66 through the port 74 and thus permitting the pressure in the compartment 68 to rise.

The air data computer 37 will have a static pressure compensator therein; and masses of air under a predetermined pressure must be supplied to the inlet port of that air data computer to enable that static pressure compensator to be tested. Similarly masses of air under a predetermined lesser pressure must be drawn away from the outlet port of that air data computer to enable that static pressure compensator to be tested. The control system provided by the present invention develops the masses of air which must be supplied to the inlet port of that air data computer, and it draws away the masses of air which must be drawn away from the outlet port of that air data computer; and hence it facilitates the testing of the static pressure compensator in that air data computer. It will be noted that the control system provided by the present invention uses just one air-moving pump to develop the masses of air which are supplied to the inlet port of the air data computer 37, and to draw away the masses of air from the outlet port of that air data computer. In making it possible to use just one air-moving pump, the present invention reduces the overall size and the overall cost of the control system needed to test the static pressure compensator in the air data computer 37. Also it will be noted that the pressure-regulating valve 62 will respond to changes in the reference pressure within the chamber 77 thereof to change the predetermined lesser pressure maintained at the outlet port of the air data computer 37.

The air data computer 37 and the pneumatic test set 84 can be of typical form. However, that pneumatic test set must be capable of supplying a sufficient range of reference pressures to the compartment 77 in the pressure-regulating valve 62 and to the air data computer 37 to enable the static pressure compensator in the air data computer 37 to be tested throughout the desired range of stimulated altitudes.

In the testing of the static pressure compensator within the air data computer 37, the pneumatic test set 84 will be adjusted to supply a predetermined reference pressure to the compartment 77 in the pressure-regulating valve 62 and to the air data computer 37. The motor, not shown, which drives the air-moving pump 10 will be started; and that pump will supply air to the inlet port of the pressure-regulating valve 14. The adjusting screw 32 of that pressure-regulating valve will be set to establish a predetermined pressure at the outlet port of that pressure-regulating valve, and hence at the inlet port of that air data computer. The reading on the Bourdon gauge 36 will indicate to the operator when the desired setting of that adjusting screw has been attained.

The air-moving pump 10 will be capable of developing a pressure that is materially greater than the pressure desired at the inlet port of the air data computer 37; but it would not be desirable to have that air-moving pump develop such a pressure. The development of such a pressure would require a needlessly large motor to drive the air-moving pump 10, would require needles expenditures of power, and would also subject the moving parts of that air-moving pump to needless wear. The control system provided by the present invention makes it possible to develop the desired pressure at the inlet port of the air data computer 37 while permitting the pressure at the outlet port of the air-moving pump 10 to exceed that pressure by only a small value.

Whenever the pressure at the outlet port of the air-moving pump 10 tends to exceed the pressure at the outlet port of the pressure-regulating valve 14 by more than three pounds per square inch, the flexible diaphragm 48 of the pressure differential control valve 40 will shift upwardly. Thereupon, enough air will pass downwardly through the compartment 44 and out through the vent 52 to keep the pressure at the inlet port of the pressure differential control valve 40, and hence at the outlet port of the air-moving pump 10, from exceeding the pressure at the outlet port of the pressure-regulating valve 14 by more than three pounds per square inch. If the differential between the pressure at the inlet port of the pressure differential control valve 40 and the pressure at the outlet port of the pressure-regulating valve 14 tends to become less than three pounds per square inch, the helical compression spring 50 will shift the flexible diaphragm 48 of the pressure differential control valve 40 downwardly. Thereupon, less air will pass downwardly through the compartment 44 and out through the vent 52, and the pressure at the inlet port of the pressure differential control valve 40 will increase until it again exceeds the pressure at the outlet port of the pressure-regulating valve 14 by three pounds per square inch.

The reference pressure in the conduit 80 will be established and maintained by the pneumatic test set 84; and the pressure-regulating valve 62 will keep a pressure in the conduit 56 which is greater than that reference pressure by a predetermined amount. As a result, the control system shown in FIG. 1 is able to establish and maintain a predetermined pressure at the outlet port of the air data computer 37.

If desired, as shown by FIG. 2, the pressure-regulating valve 14 and the differential pressure control valve 40 can be replaced by the pressure-regulating valve 90. That pressure-regulating valve has a partition 92 with a passage-forming seat 94 therein. That partition coacts with a flexible diaphragm 96 to subdivide the housing of the valve 90 into three compartments 98, 100 and 102. The conduit 12 communicates directly with the chamber 98, and the conduit 34 communicates directly with the chamber 100. A vent 97, which has a seat at the upper end thereof, also communicates with the chamber 98. A movable element 104, which includes two spherical members, underlies and bears against the flexible diaphragm 96; and a helical compression spring 110 urges that movable element upwardly. An adjusting screw 108 is rotatably mounted in a threaded opening in the housing for the valve 90; and a helical compression spring 107 bears against a centering element carried by that adjusting screw. The lower end of that helical compression spring bears against the flexible diaphragm 96. A vent 109 places the chamber 102 in direct communication with the atmosphere external of the valve 90.

The helical compression spring 107 urges the flexible diaphragm 96 to shift downwardly, and thereby move the lower spherical member of the movable element 104 toward the seat at the upper end of the vent 97 while moving the upper spherical member of that movable element away from the seat 94. However, the helical compression spring 110 and the pressure within the chamber 100 urges that flexible diaphragm to shift upwardly, and thereby move the lower spherical member of the movable element 104 away from the seat at the upper end of the vent 97 while moving the upper spherical member of that movable element toward the seat 94. The helical compression spring 107 is stronger than the helical compression spring 110, and hence a predetermined minimum pressure is required within the chamber 100 to cause the upper spherical member of the movable element 104 to move into engagement with the seat 94 and thereby cut off further ingress of compressed air into the chamber 100. As the upper spherical member of the movable element 104 moves upwardly toward the seat 94, the lower spherical member of that movable element will move away from the seat at the upper end of the vent 97; and hence, as the desired pressure builds up within the chamber 100, the compressed air entering the chamber 98 from the conduit 12 will be able to escape through the vent 97 to the ambient atmosphere rather than develop undesirably high levels of pressure in that conduit and hence at the outlet port of the pump 10. The overall result is that the load on the motor which drives the pump 10 will always be kept relatively low, thereby enabling a small motor to be used and also reducing the amount of wear on the pump 10.

Both embodiments of the control system provided by the present invention are thus enabled to use just one air-moving pump to supply masses of air at a predetermined pressure and to draw away further masses of air at a lesser predetermined pressure. Also, both embodiments of that control system are enabled to keep the pressure at the outlet port of that air-moving pump at a level which is just slightly greater than the level of pressure being maintained on the first masses of air. In addition, both embodiments of that control system are able to vary the lesser predetermined pressure, on those further masses of air, in accordance with changes in an altitude-simulating reference pressure. The pressure-regulating valve 14 and the differential pressure control valve 40, of the embodiment of control system provided by the present invention and shown in FIG. 1, can be made with less stringent tolerances than can the pressure regulating valve 90 of the embodiment of control system provided by the present invention and shown in FIG. 2.

The Bourdon gauges 36 shown in FIGS. 1 and 2 are very useful, but other types of gauges could be used in lieu of those Bourdon gauges. In the foregoing description, the pressure differential control valve 40 is set to keep the pressure in the conduit 38 substantially three pounds per square inch above the level of the pressure in the conduit 54. However, if desired, that pressure differential control valve can be set to keep the pressure in the conduit 38 at any desired level above the level of the pressure in the conduit 54.

Whereas the drawing and accompanying description have shown and described two preferred embodiments of the present invention it should be apparent to those skilled in the art that various changes may be made in the form of the invention without affecting the scope thereof.

What I claim is:

1. A control system that can supply a mass of air to a device under a predetermined pressure and that can draw a further mass of air away form said device under a lesser predetermined pressure and that comprises:

an air-moving pump having an inlet port and an outlet port and having said inlet port thereof connected to the outlet port of said device, a pressure regulator connected intermediate said outlet port of said air-moving pump and the inlet port of said device, said pressure regulator being adapted to receive compressed air from said outlet port of said air-moving pump, to vent some of said compressed air to the ambient atmosphere, and to pass other of said compressed air to said inlet port of said device, the venting of said some of said compressed air to the ambient atmosphere keeping the pressure at said outlet port of said air-moving pump from exceeding a pre-set value, said pressure regulator maintaining said predetermined pressure on said other of said compressed air which it passes to said inlet port of said device, and a pressure-regulating valve connected to the inlet port of said air-moving pump, said pressure-regulating valve having a port that communicates with the ambient atmosphere and that is adapted to admit air, said pressure-regulating valve having a movable element therein that moves to vary the amount of air admitted through said port of said pressure-regulating valve, said pressure-regulating valve passing said admitted air to said inlet port of said air-moving pump, and thereby maintaining said lesser predetermined pressure on said further mass of air.

2. A control system that can supply a mass of air to a device under a predetermined pressure and that can draw a further mass of air away from said device under a lesser predetermined pressure and that comprises:

an air-moving pump having an inlet port and an outlet port and having said inlet port thereof connected to the outlet port of said device, a pressure regulator connected intermediate said outlet port of said air-moving pump and the inlet port of said device, said pressure regulator being adapted to receive compressed air from said outlet port of said air-moving pump, to vent some of said compressed air to the ambient atmosphere, and to pass other of said compressed air to said inlet port of said device, the venting of said some of said compressed air to the ambient atmosphere keeping the pressure at said outlet port of said air-moving pump from exceeding a pre-set value, said pressure regulator maintaining said predetermined pressure on said other of said compressed air which it passes to said inlet port of said device, and a pressure-regulating valve connected to the inlet port of said air-moving pump, said pressure-regulating valve having a port that communicates with the ambient atmosphere and that is adapted to admit air, said pressure-regulating valve having a movable element therein that moves to vary the amount of air admitted through said port of said pressure-regulating valve, said pressure-regulating valve passing said admitted air to said inlet port of said air-moving pump, and thereby maintaining said lesser predetermined pressure on said further mass of air, said pressure regulator being a pressure-regulating valve which has an inlet port connected to said outlet port of said air-moving pump, which has an outlet port connected to said inlet port of said device, which has a vent to the ambient atmosphere, and which has a movable element that moves to vary the proportion of air passing to said outlet port of said pressure-regulating valve or to said vent of said pressure-regulating valve.

3. A control system that can supply a mass of air to a device under a predetermined pressure and that can draw a further mass of air away from said device under a lesser predetermined pressure and that comprises:

an air-moving pump having an inlet port and an outlet port and having said inlet port thereof connected to the outlet port of said device, a pressure regulator connected intermediate said outlet port of said air-moving pump and the inlet port of said device, said pressure regulator being adapted to receive compressed air from said outlet port of said air-moving pump, to vent some of said compressed air to the ambient atmosphere, and to pass other of said compressed air to said inlet port of said device, the venting of said some of said compressed air to the ambient atmosphere keeping the pressure at said outlet port of said air-moving pump from exceeding a pre-set valve, said pressure-regulator maintaining said predetermined pressure on said other of said compressed air which it passes to said inlet port of said device, and a pressure-regulating valve connected to the inlet port of said air-moving pump, said pressure-regulating valve having a port that communicates with the ambient atmosphere and that is adapted to admit air, said pressure-regulating valve having a movable element therein that moves to vary the amount of air admitted through said port of said pressure-regulating valve, said pressure-regulating valve passing said admitted air to said inlet port of said air-moving pump, and thereby maintaining said lesser predetermined pressure on said further mass of air, said pressure regulator including a pressure-regulating valve and a differential pressure control valve, said pressure-regulating valve of said pressure regulator having the inlet port thereof connected to said outlet port of said air-moving pump and having the outlet port thereof connected to said inlet port of said device, said differential pressure control valve having the inlet port thereof connected to said outlet port of said air-moving pump and having the outlet port thereof connected to said outlet port of said pressure-regulating valve of said pressure regulator, said differential pressure control valve having a vent to the ambient atmosphere, said differential pressure control valve venting to the ambient atmosphere some compressed air from said air-moving pump whenever the pressure at said inlet port of said differential pressure control valve exceeds the pressure at said outlet port of said pressure-regulating valve by a predetermined amount.

4. A control system that can supply a mass of air to a device under a predetermined pressure and that can draw a further mass of air away from said device under a lesser predetermined pressure and that comprises:

an air-moving pump having an inlet port and an outlet port and having said inlet port thereof connected to the outlet port of said device, a pressure regulator connected intermediate said outlet port of said air-moving pump and the inlet port of said device, said pressure regulator being adapted to receive compressed air from said outlet port of said air-moving pump, to vent some of said compressed air to the ambient atmosphere, and to pass other of said compressed air to said inlet port of said device, the venting of said some of said compressed air to the ambient atmosphere keeping the pressure at said outlet port of said air-moving pump from exceeding a pre-set valve, said pressure-regulator maintaining said predetermined pressure on said other of said compressed air which it passes to said inlet port of said device, and a pressure-regulating valve connected to the inlet port of said air-moving pump, said pressure-regulating valve having a port that communicates with the ambient atmosphere and that is adapted to admit air, said pressure-regulating valve having a movable element therein that moves to vary the amount of air admitted through said port of said presure-regulating valve, said pressure-regulating valve passing said admitted air to said inlet port of said air-moving pump, and thereby maintaining said lesser predetermined pressure on said further mass of air, said pressure regulator being adjustable to adjust the pressure at said inlet port of said device, and said pressure-regulating valve being adjustable to adjust the pressure at said inlet port of said air-moving pump.

5. A control system that can supply a mass of air to a device under a predetermined pressure and that can draw a further mass of air away from said device under a lesser predetermined pressure and that comprises:
an air-moving pump having an inlet port and an outlet port and having said inlet port thereof connected to the outlet port of said device,
a pressure regulator connected intermediate said outlet port of said air-moving pump and the inlet port of said device,
said pressure regulator being adapted to receive compressed air from said outlet port of said air-moving pump, to vent some of said compressed air to the ambient atmosphere, and to pass other of said compressed air to said inlet port of said device,
the venting of said some of said compressed air to the ambient atmosphere keeping the pressure at said outlet port of said air-moving pump from exceeding a pre-set value,
said pressure-regulator maintaining said predetermined pressure on said other of said compressed air which it passes to said inlet port of said device, and
a pressure-regulating valve connected to the inlet port of said air-moving pump,
said pressure-regulating valve having a port that communicates with the ambient atmosphere and that is adapted to admit air,
said pressure-regulating valve having a movable element therein that moves to vary the amount of air admitted through said port of said pressure-regulating valve,
said pressure-regulating valve passing said admitted air to said inlet port of said air-moving pump, and thereby maintaining said lesser predetermined pressure on said further mass of air,
said pressure regulator being adjustable to adjust the pressure at said inlet port of said device,
a variable reference applied to said pressure-regulating valve, and said pressure-regulating valve responding to changes in said variable reference to change the pressure at said inlet port of said air-moving pump.

6. A control system that can supply a mass of air to a device under a predetermined pressure and that can draw a further mass of air away from said device under a lesser predetermined pressure and that comprises:
an air-moving pump having an inlet port and an outlet port and having said inlet port thereof connected to the outlet port of said device,
a pressure regulator connected intermediate said outlet port of said air-moving pump and the inlet port of said device,
said pressure regulator being adapted to receive compresed air from said outlet port of said air-moving pump, to vent some of said compressed air to the ambient atmosphere, and to pass other of said compressed air to said inlet port of said device,
the venting of said some of said compressed air to the ambient atmosphere keeping the pressure at said outlet port of said air-moving pump from exceeding a pre-set value,
said pressure-regulator maintaining said predetermined pressure on said other of said compressed air which it passes to said inlet port of said device, and
a pressure-regulating valve connected to the inlet port of said air-moving pump,
said pressure-regulating valve having a port that communicates with the ambient atmosphere and that is adapted to admit air,
said pressure-regulating valve having a movable element therein that moves to vary the amount of air admitted through said port of said pressure-regulating valve,
said pressure-regulating valve passing said admitted air to said inlet port of said air-moving pump, and thereby maintaining said lesser predetermined pressure on said further mass of air,
said pressure-regulating valve having a chamber in which a reference pressure can be maintained and having a flexible diaphragm which flexes in response to changes in the difference between said reference pressure and the pressure at said inlet port of said air-moving pump,
said flexible diaphragm moving said movable element to keep said pressure at said inlet port of said air-moving pump at a predetermined value relative to said reference pressure.

7. A control system that can supply a mass of air to a device under a predetermined pressure and that can draw a further mass of air away from said device under a lesser predetermined pressure and that comprises:
an air-moving pump having an inlet port and an outlet port and having said inlet port thereof connected to the outlet port of said device,
a pressure regulator connected intermediate said outlet port of said air-moving pump and the inlet port of said device,
said pressure regulator being adapted to receive compressed air from said outlet port of said air-moving pump, to vent some of said compressed air to the ambient atmosphere, and to pass other of said compressed air to said inlet port of said device,
the venting of said some of said compressed air to the ambient atmosphere keeping the pressure at said outlet port of said air-moving pump from exceeding a pre-set value,
said pressure-regulator maintaining said predetermined pressure on said other of said compressed air which it passes to said inlet port of said device, and
a pressure-regulating valve connected to the inlet port of said air-moving pump,
said pressure-regulating valve having a port that communicates with the ambient atmosphere and that is adapted to admit air,
said pressure-regulating valve having a movable element therein that moves to vary the amount of air admitted through said port of said pressure-regulating valve,
said pressure-regulating valve passing said admitted air to said inlet port of said air-moving pump, and thereby maintaining said lesser predetermined pressure on said further mass of air,
said pressure-regulating valve having a chamber in which a reference pressure can be maintained and having a flexible diaphragm which flexes in response to changes in the difference between said reference pressure and the pressure at said inlet port of said air-moving pump,
said flexible diaphragm moving said movable element to keep said pressure at said inlet port of said air-moving pump at a predetermined value relative to said reference pressure, and
means to establish different values of reference pressure in said chamber, and thereby enable said control system to provide different pressures at said inlet port of said air-moving pump.

8. A control system that can supply a mass of air to a device under a predetermined pressure and that can draw a further mass of air away from said device under a lesser predetermined pressure and that comprises:
an air-moving pump having an inlet port and an outlet port and having said inlet port thereof connected to the outlet port of said device,
a pressure regulator connected intermediate said outlet port of said air-moving pump and the inlet port of said device, said pressure regulator being adapted to receive compressed air from said outlet port of said air-moving pump, to vent some of said compressed air to the ambient atmosphere, and to pass other of said compressed air to said inlet port of said device, the venting of said some of said compressed air to the ambient atmosphere keeping the pressure at said outlet port of said air-moving pump from exceeding a pre-set value, said pressure-regulator maintaining said predetermined pressure on said other of said compressed air which it passes to said inlet port of said device, and a pressure-regulating valve connected to the inlet port of said air-moving pump, said pressure-regulating valve having a port that communicates with the ambient atmosphere and that is adapted to admit air, said pressure-regulating valve having a movable element therein that moves to vary the amount of air admitted through said port of said pressure-regulating valve, said pressure-regulating valve passing said admitted air to said inlet port of said air-moving pump, and thereby maintaining said lesser predetermined pressure on said further mass of air, said pressure regulator having a chamber that communicates with said inlet port of said device and that has a flexible diaphragm as part of the interior of said chamber, said pressure regulator having a movable element that responds to flexing of said flexible diaphragm to vary the admission of air into said chamber, and said pressure-regulating valve having a flexible diaphragm that can move said movable element, said flexible diaphragm of said pressure-regulating valve responding to a reference pressure and to the pressure at said inlet port of said air-moving pump to regulate the admission of air through said port of said pressure-regulating valve.

9. A control system that can supply a mass of air to a device under a predetermined pressure and that can draw a further mass of air away from said device under a lesser predetermined pressure and that comprises:

an air-moving pump having the inlet port thereof connected to the outlet port of said device, means connected intermediate the outlet port of said air-moving pump and the inlet port of said device, said means being adapted to receive compressed air from said outlet port of said air-moving pump, to vent some of said compressed air to the ambient atmosphere, and to pass other of said compressed air to said inlet port of said device, the venting of said some of said compressed air to the ambient atmosphere keeping the pressure at said outlet port of said air-moving pump from exceeding a pre-set value, said pre-set value being greater than said predetermined pressure, said means maintaining said predetermined pressure on said other of said compressed air which it passes to said inlet port of said device, and further means connected to the inlet port of said air-moving pump, said further means having a port that communicates with the ambient atmosphere and that is adapted to admit air, said further means being adapted to vary the amount of air admitted through said port thereof, said further means passing said admitted air to said inlet port of said air-moving pump, and thereby maintaining said lesser predetermined pressure on said further mass of air.

References Cited

UNITED STATES PATENTS 3,029,636  4/1962  Mullins _____ 137—565
3,187,764  6/1965  Arenhold _____ 137—114

NATHAN L. MINTZ, *Primary Examiner.*

U.S. Cl. X.R.

137—114